(12) United States Patent
Ralph

(10) Patent No.: US 9,504,309 B2
(45) Date of Patent: Nov. 29, 2016

(54) CONNECTOR APPARATUS, SYSTEM, AND METHOD OF USE

(71) Applicant: Douglas Ralph, Brookville, IN (US)

(72) Inventor: Douglas Ralph, Brookville, IN (US)

( * ) Notice: Subject to any disclaimer, the term of this patent is extended or adjusted under 35 U.S.C. 154(b) by 223 days.

(21) Appl. No.: 14/506,629

(22) Filed: Oct. 4, 2014

(65) Prior Publication Data

US 2016/0095422 A1   Apr. 7, 2016

(51) Int. Cl.
| | | |
|---|---|---|
| *A45F 5/02* | (2006.01) | |
| *A45F 5/00* | (2006.01) | |
| *F16B 2/12* | (2006.01) | |
| *B23P 19/00* | (2006.01) | |

(52) U.S. Cl.
CPC .............. *A45F 5/021* (2013.01); *A45F 5/00* (2013.01); *F16B 2/12* (2013.01); *Y10T 29/49822* (2015.01); *Y10T 29/49824* (2015.01)

(58) Field of Classification Search
CPC ............. Y10T 24/45; Y10T 24/45005; Y10T 24/4501; Y10T 24/45037; Y10T 24/45063; Y10T 24/45079; Y10T 24/45634; Y10T 24/45471; Y10T 24/45513; Y10T 24/45529; Y10T 29/49822; Y10T 29/49824; A45F 5/02; B25B 1/00; B25B 1/02; B25B 1/24; B25B 1/241; B25B 1/2489; B25B 3/00; B25B 7/00; B25B 5/00; B25B 5/02; B25B 5/163; B25B 5/166; F16B 2/12
USPC ........ 24/3.12, 8; 269/3, 6, 95, 271; 248/215, 248/225.21, 339
See application file for complete search history.

(56) References Cited

U.S. PATENT DOCUMENTS

| | | | | |
|---|---|---|---|---|
| 1,039,337 | A * | 9/1912 | Vanderbeek | B23Q 3/02 269/156 |
| 1,179,256 | A * | 4/1916 | Whitney | A44B 5/00 24/3.12 |
| 5,149,136 | A * | 9/1992 | Maekawa | B60R 22/203 280/801.2 |
| 5,327,619 | A * | 7/1994 | Ortega | A44B 11/266 24/616 |
| 5,338,045 | A * | 8/1994 | Yang | B25B 11/002 279/126 |
| 6,336,663 | B1 * | 1/2002 | Ando | B60R 22/203 280/801.2 |
| 7,007,352 | B1 | 3/2006 | Hill | |
| 7,513,531 | B2 * | 4/2009 | Gray | B60R 22/202 280/801.2 |
| 8,256,071 | B2 * | 9/2012 | Okuda | A45F 5/02 24/517 |
| 8,523,229 | B1 * | 9/2013 | Kohlndorfer | B60R 22/203 280/801.1 |
| 8,713,764 | B1 | 5/2014 | Rittenhouse | |
| 8,955,280 | B2 * | 2/2015 | Fabis | E04F 13/21 411/384 |
| 9,223,191 | B2 * | 12/2015 | Fujiwara | G03B 17/566 |
| 9,243,400 | B2 * | 1/2016 | Fabis | E04F 13/21 |
| 2004/0166458 | A1 * | 8/2004 | Opin | A61C 7/02 433/11 |

(Continued)

FOREIGN PATENT DOCUMENTS

SE   WO 0229259 A1 *   4/2002   ............... F16B 2/12

*Primary Examiner* — Essama Omgba
(74) *Attorney, Agent, or Firm* — Roberts IP Law; John Roberts

(57) ABSTRACT

A connector apparatus, system, and method of use comprising a reusable connector that when attached to gear may be used without tools to removably and adjustably attach the gear securely to a base unit such as belts having different widths or a MOLLE/PALS attaching system. Connectors may comprise disengageable uni-directional teeth on mating slide and engagement members. In various example embodiments each connector can simultaneously engage with multiple rows of straps in a MOLLE/PALS attaching system, the connectors can be used to mount gear alternatively either high or low, and multiple connectors can be used on a single piece of gear. A user can adjust the connection of gear while wearing the gear using certain example embodiments of the connector.

17 Claims, 7 Drawing Sheets

(56) References Cited

U.S. PATENT DOCUMENTS

| | | | |
|---|---|---|---|
| 2009/0094806 A1* | 4/2009 | Okuda | A45F 5/02 24/457 |
| 2013/0074294 A1* | 3/2013 | Lynch | A47G 21/167 24/535 |
| 2014/0245683 A1* | 9/2014 | Fabis | E04F 13/21 52/309.4 |
| 2015/0159364 A1* | 6/2015 | Fabis | E04F 13/21 52/506.05 |
| 2016/0095422 A1* | 4/2016 | Ralph | A45F 5/021 29/426.2 |

* cited by examiner

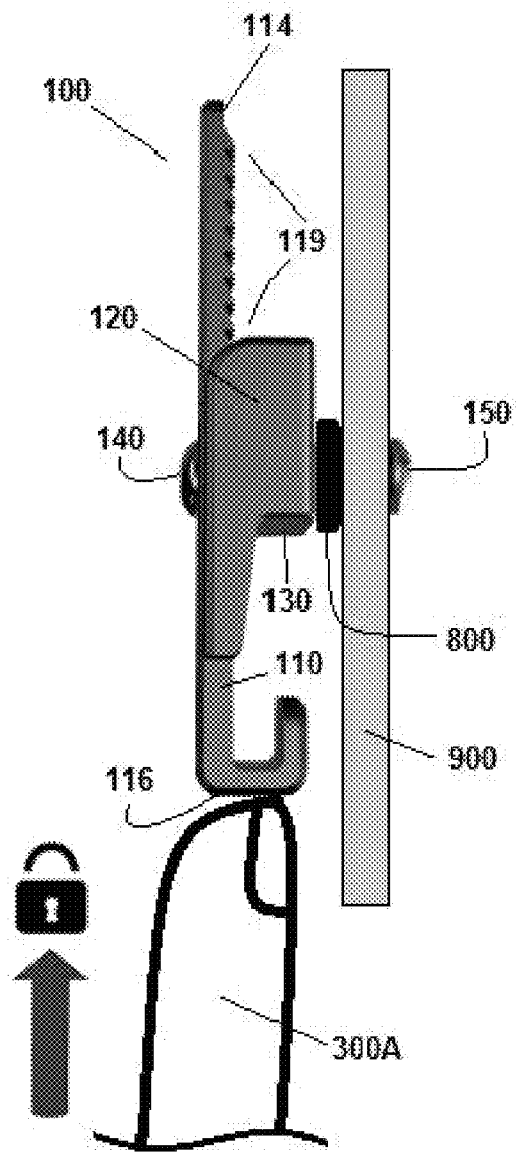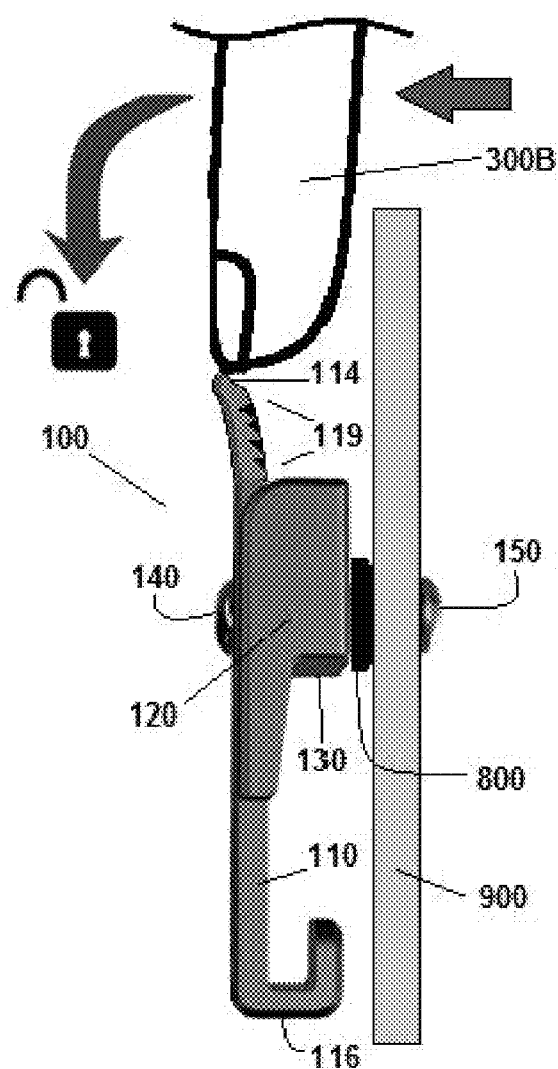
FIG. 3A
FIG. 3B

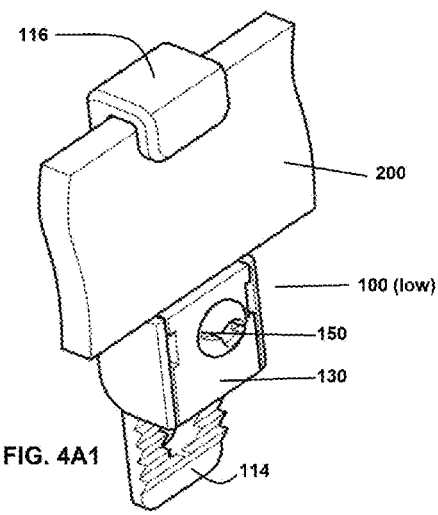
FIG. 4A1
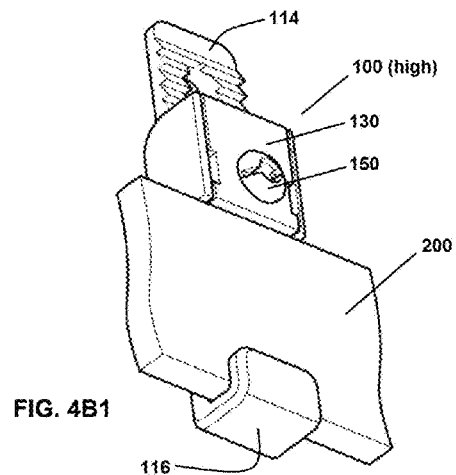
FIG. 4B1
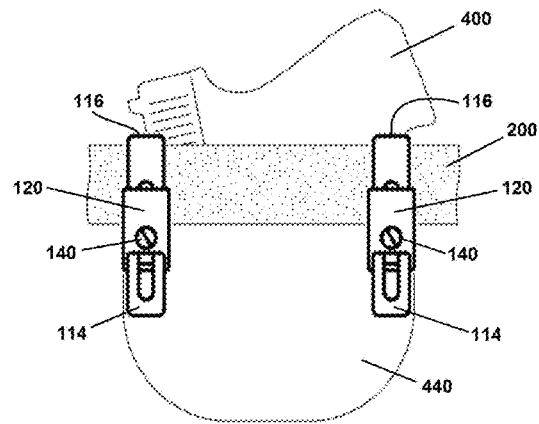
FIG. 4A2
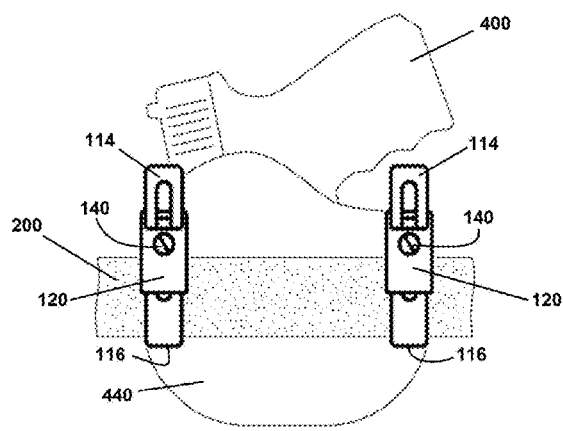
FIG. 4B2

CONNECTOR APPARATUS, SYSTEM, AND METHOD OF USE

CROSS-REFERENCE TO RELATED APPLICATIONS

None.

FEDERALLY SPONSORED RESEARCH OR DEVELOPMENT

None.

TECHNICAL FIELD

The present invention is directed to a reusable connector that when attached to gear may be used without tools to removably and adjustably attach the gear securely to a base unit such as belts having different widths or a MOLLE/PALS attaching system.

BACKGROUND

GI Alice Keep Clips/Belt Slides ("Alice clips") have traditionally been used to attach gear to belts, vests, packs, or other "base unit." In most situations, the base unit is wearable or portable. Exemplary types of gear that have been attached include military gear such as gun holsters or knife sheaths, survival gear such as first aid kits, compasses, or canteens, hunting gear, fishing gear, camping gear, police gear, miscellaneous gear pouches, or other gear that one might want to attach to a base unit. To work with an Alice clip a base unit or gear would only need a loop, hook, strap, or other attachment mechanism through which the Alice clip may be inserted or fastened around. In some cases, the gear or base unit attachment mechanism could be part of the base unit itself. For example, a belt may be sufficiently narrow that the Alice clip may fasten around the belt without any additional structure needed.

As shown and described with respect to FIG. 1 in U.S. Pat. No. 7,007,352 B1 issued Mar. 7, 2006 to Hill (hereafter "Hill"), the entirety of which is incorporated herein by reference, a traditional Alice clip is made from three metal pieces held together by tension, that when released tend to spring-apart, often hurting the user. As illustrated in Hill, an Alice clip may be used to attach gear to a base unit in three steps: an opening step, a positioning step, and a closing step. In the opening step, the back gate of the Alice clip is slid so that the Alice clip is in the open position. In one type of positioning step, one body leg is positioned through or around both the attachment mechanism of the base unit and the attachment mechanism of the gear. In an alternative second step, one body leg is positioned through or around the attachment mechanism of the base unit and the other body leg is positioned through or around the attachment mechanism of the gear. In the closing step, the back gate of the Alice clip is slid so that the Alice clip is in the closed position. It should be noted that the Alice clip is not truly locked because the back gate can easily or accidentally be slid open again.

Alice clips are generally disliked for many reasons. In the closed position, they dig into the user's hip or otherwise gouge and poke the user. When they are opened they are designed to spring-open, which tends to result in a painful "snap" to the user. They have been known to come loose or break under pressure. Because they have several sharp or narrow points, they tend to snag on anything that comes near including branches, leaves, other clothing, other gear, and anything else that touches the clip. When Alice clips come loose, break, or snag, the result is often lost gear and, under extreme situations, lost gear falling into the hands of the enemy. They tend to make noise because they rattle, and they tend to make noise as they open. Being metal, they tend to add weight, and do not float. Other problems with using metal clips is that they can set off magnetic mines and be detected by enemy ground or air surveillance radars. Importantly, gear held on by an Alice clip also tends to slide around, for instance laterally left and right on a belt. Gear sliding around can interfere with movements of the user's body and make it difficult to interact with the gear, for instance delaying the time it takes to pull a pistol out of a holster, when split-seconds can make all the difference.

Military personnel have been known to substitute creative securing devices for Alice clips. One substitute is parachute cord or other tieable apparatus. Tieable apparatus must be untied for removal, a process that is too slow to make tieable apparatus convenient for use in critical situations. Another substitute is black plastic electrical "tyton" ties or heavy zip ties. Only the strongest weight-rated ties can meet the weight requirements of military personnel. Also, since they are supposed to be cut for removal, extras must be carried if removed gear is to be reattached. In some cases, ties may be unfastened by inserting a small penknife into the locking tab to unfasten the tie. But most of the time this does not work and, if it does, the locking tab is weakened and often will be unable to secure the tie together again and hold the same load. Thus, zip ties and the like are not considered reusable.

A product available from Tactical Tailor of Lakewood, Wash. called a Malice Clip® is a reusable, high strength, injection molded, connecting clip. Once attached they require flat tipped object (a screwdriver, car key, knife point, bullet point, ball point pen) to be inserted into the opening slot on the back of the clip to unlock it in order to adjust it or remove it. The clip will not open for removal or adjustment of tightness of fit until it is disengaged by the user using the flat tipped object. Sometimes, however, gear needs to be removed quickly, especially in cases of emergency. Also, gear may begin to slide around on the base unit requiring tightening of the clip, but adjusting the tightness of this clip requires the same cumbersome steps as removal.

Soft belt keeper systems include a strap and a connection apparatus. The strap is generally made from nylon, webbing, leather, or other flexible material. The connection apparatus is generally a two-part device such as a snap or a hook-and-loop fabric (e.g., Velcro®) closure mechanism. The straps generally have a first part of the connection apparatus on one end of the strap and a second part of the connection apparatus on the opposite end of the strap. Gear is held to a base unit by wrapping the strap around the base unit and interconnecting the two parts of the connection apparatus. In addition to requiring threading or looping, these systems may inadvertently disengage or loosen, and are typically unable to form a consistently tight attachment to the base unit to prevent the gear from sliding around.

In addition to a user's belt, another type of base unit of particular significance is the MOLLE/PALS attachment or connecting system, examples of which are shown and described in U.S. Pat. No. 8,713,764 B1 issued May 6, 2014 to Rittenhouse et al. (hereafter "Rittenhouse"), which patent is incorporated herein by reference in its entirely. The term "PALS" is an acronym for Pouch Attachment Ladder System and comprises a grid of webbing originated by the United States Army Development and Engineering Center that is used to attach smaller equipment on to a load bearing platform mounted on an individual. The term "MOLLE" is an acronym for Modular Lightweight Load-Carrying Equipment. The MOLLE/PALS attachment or connecting system has become a de facto standard for modular tactical gear and has served to replace the "click and stick" system used in the earliest modular vest systems, which may still be in use in many police departments. Currently there are three general modes of attachment in the MOLLE environment. They include the "Natick Snap" that uses a polyethylene reinforced webbing strap with a "Pushthedot" snap for security. In addition there is the polymer Malice Clip® described above as an alternative to the Natick snap concept. Finally, there are a variety of attachments that fall into "Weave and Tuck" categories in which the end of an interwoven strap is tucked into an items backing after attachment to a vest or pack.

The gear typically supported in the MOLLE environment may include modular packs, pouches, vests, holsters and other modern military gear which may be cooperatively structured with a support platform including backpacks, harnesses, and the like. As such, the attachment or connecting system commonly used for the removable support of military gear, in the manner described above incorporates the "PALS" webbing structure. In cooperation therewith, the support platform will incorporate a "MOLLE" compatible system.

More specifically, as shown and described in Rittenhouse, the MOLLE/PALS systems include both the supported object and the support platform having a plurality of rows of elongated webbing strips stacked vertically one above the other, with spaces between each row. Each strip is attached to a corresponding surface in a manner which forms a plurality of successive, immediately adjacent loops along the length of the respective strips. Moreover, each of the strips on each of the supported object and support platform is substantially horizontally oriented and vertically spaced from one another. In order to provide a cooperative, reliable and easily attached and detached connecting system, the space between each of the plurality of webbing strips includes a predetermined transverse dimension. More specifically, the transverse dimension of the space located between each of the webbing strips of both the supported objects and the support platform are sufficient to allow a corresponding webbing strip on the other of the supported object or support platform to be nested there between. As a result, correspondingly disposed loops are disposed in linear axial alignment with one another. This alignment of loops facilitates the passage of various types of connecters to pass there through in order to accomplish either an attachment or detachment of the supported object and support platform.

However, known or conventional connecting structures which have been adapted for use with the MOLLE/PALS system include recognized disadvantages. For example and as indicated above, known connecting structures include flexible straps which are intended to pass through the successively aligned loops of both the supported object and the support platform. However, the flexibility of such straps inhibit their insertion through the aligned loops and as a result their use is time consuming and generally unreliable.

Accordingly, there is a need in this area for a connector having cooperative structuring to be efficiently and effectively used with the MOLLE/PALS systems in a manner which overcomes the commonly recognized disadvantages. As such, a proposed and improved connector should include sufficient rigidity to facilitate the threading of the connector through the aligned loops of the cooperative webbing strips of both the supported object and the support platform.

Moreover, an improved connector should also include a locking assembly having the ability to reliably maintain the connection between the supported object or gear and the support platform or base unit. A proposed locking assembly used in combination with an improved connector should be capable of easy and efficient positioning between a locking orientation and a release orientation, so that a user can quickly attach or detach the supported object or gear relative to the support platform or base unit.

Rittenhouse proposes an elongated, rigid structure resembling a popsicle stick or tongue depressor with a pinching clip on one end. While the Rittenhouse structure would serve to connect gear with a base unit using the MOLLE/PALS system, it would not be useful in other circumstances, for instance in attaching a conventional holster to a conventional belt. Also, the Rittenhouse structure relies on a friction clamp on one end only, thus any impact or other force that overcomes that friction could cause the Rittenhouse structure to inadvertently dislodge.

Hill, on the other hand, discloses a reusable connector with a sliding door 58 that opens vertically to expose a cavity into which a belt or the like could be placed, and then the sliding door 58 can be closed and latched, trapping the belt in the cavity. Hill does not mention and is not adapted for use with the MOLLE/PALS system. Moreover, the cavity in the hill device is of a fixed size, so it cannot be adjusted to or tightened against different sized belts or other base units. Accordingly, the Hill device will allow gear to slide around on the user's belt or other base unit, which as previously discussed can cause discomfort as well as potentially life-threatening difficulties and delays in accessing the gear. Finally, to open the Hill structure one would have to reach in and pinch the barbed tips 90 while pulling up on the door 58; not something that could be easily or quickly done, especially by the user while wearing the device on a belt, for instance.

What is needed is a lightweight, inexpensive, reusable connector that when attached to gear may easily and comfortably be used without tools to removably and adjustably attach the gear quickly and securely to a base unit, and that is particularly adapted for use with both belts and a MOLLE/PALS attaching system.

SUMMARY OF EXAMPLE ASPECTS OF THE INVENTION

The present invention, which is defined only by the claims, provides a novel and elegant solution to the problems associated with past systems and provides many other advantages as will be apparent to persons of skill in the art. Provided in various example embodiments is a connector apparatus, system, and method of use comprising a reusable connector that when attached to gear may be used without tools to removably and adjustably attach the gear securely to a base unit such as belts having different widths or a MOLLE/PALS attaching system. Connectors may comprise disengageable, uni-directional teeth on mating slide and engagement members. In various example embodiments each connector can simultaneously engage with multiple rows of straps in a MOLLE/PALS attaching system, the connectors can be used to mount gear alternatively either high or low, and multiple connectors can be used on a single piece of gear. Due to the ease of use of the connector, a user can adjust the connection of gear while wearing the gear using certain example embodiments of the connector.

More specifically, provided in various example embodiments is a reusable connector capable of repeatedly attaching and detaching gear tightly to belts or straps of different widths, without the use of tools, the connector comprising: a slide member comprising an elongated first body extending longitudinally from a first end to a second end and having a width between a left side and a right side and having a thickness between a front side and a back side, with a protrusion extending from the second end of the front side, the protrusion defining a first support surface adapted to securely engage a first edge of a belt or strap, the slide member having first teeth extending outward from the front side; an engagement member comprising a second body comprising a second support surface adapted to engage a second edge of the belt or strap, the engagement member further comprising one or more second teeth adapted to engage the first teeth, the engagement member slidably attached with the slide member and positioned so that the first and second teeth are engaged and so that the second support surface faces the first support surface; one or more fasteners adapted to fasten gear to the connector; the first and second teeth configured to allow the engagement member to be translated toward the protrusion without the use of tools but not translated away from the protrusion when the first and second teeth are engaged; the first end of the slide member adapted to be elastically deflected away from the engagement member sufficiently to disengage the first and second teeth, without the use of tools; and the engagement member adapted to be translated away from the protrusion without the use of tools when the first end of the slide member is elastically deflected away from the engagement member sufficiently to disengage the first and second teeth.

Example connectors may further comprise a clamp comprising a third body adapted to at least partially envelope the slide member, the clamp connected with the engagement member, and one or more fasteners connecting the clamp and engagement member. Example connectors may further comprise a longitudinally-extending through-slot passing from the front side through to the back side of the slide member, the one or more fasteners passing through the slot, and a boss connected with the engagement member and extending into the through-slot, the one or more fasteners passing through a hole in the boss. In various example embodiments the clamp member may further comprise first and second sides adapted to extend around the left and right sides of the slide member and engage with corresponding first and second sides of the engagement member. In various example embodiments the protrusion may comprise a hook. In various example embodiments the fastener adapted to fasten gear to the connector may extend outward from the engagement member. Various example embodiments of the connector may further comprise an elastomeric member positioned adjacent the engagement member and adjacent the fastener adapted to fasten gear to the connector, the elastomeric member adapted to function as a spacer and as a deflectable spring between gear and the engagement member when gear is attached to the fastener adapted to fasten gear to the connector. Gear may be attached to the connector by the fastener adapted to fasten gear to the connector.

Also provided in various example embodiments is a method of repeatedly attaching and detaching gear tightly to belts or straps of different widths, without the use of tools, the method comprising the steps of (A) providing a reusable connector, the connector comprising: a slide member comprising an elongated first body extending longitudinally from a first end to a second end and having a width between a left side and a right side and having a thickness between a front side and a back side, with a protrusion extending from the second end of the front side, the protrusion defining a first support surface adapted to securely engage a first edge of a belt or strap, the slide member having first teeth extending outward from the front side; an engagement member comprising a second body comprising a second support surface adapted to engage a second edge of the belt or strap, the engagement member further comprising one or more second teeth adapted to engage the first teeth, the engagement member slidably attached with the slide member and positioned so that the first and second teeth are engaged and so that the second support surface faces the first support surface; a fastener adapted to fasten gear to the connector; the first and second teeth configured to allow the engagement member to be translated toward the protrusion without the use of tools but not translated away from the protrusion when the first and second teeth are engaged; the first end of the slide member adapted to be elastically deflected away from the engagement member sufficiently to disengage the first and second teeth, without the use of tools; and the engagement member adapted to be translated away from the protrusion without the use of tools when the first end of the slide member is elastically deflected away from the engagement member sufficiently to disengage the first and second teeth; (B) providing a belt or strap having a width between an upper surface and a lower surface; (C) positioning the belt or strap so that its upper surface is adjacent and securely engaged by the first support surface of the slide member; (D) positioning the belt or strap adjacent the front surface of the slide the slide member; and (E) translating the engagement member relative to the slide member toward the second end of the slide member until the second support surface of the engagement member contacts the lower surface of the belt or strap; (F) all of the foregoing steps being accomplished without the use of tools.

In various example embodiments the method may further comprise the steps of: (G) pushing on the first end of the slide and elastically bending the slide laterally away from the engagement member sufficiently to disengage the first and second teeth; (H) translating the engagement member relative to the slide member away from the second end of the slide member until the second support surface of the engagement member no longer contacts the lower surface of the belt or strap; (I) moving the belt or strap away from the front surface of the slide member; and (J) disengaging the upper surface of the belt or strap from the first support surface of the slide member; (K) all of the foregoing steps being accomplished without the use of tools. In various example embodiments the method may further comprise the steps of providing a plurality of the connectors; attaching the plurality of connectors to a single piece of gear using the fasteners adapted to fasten gear to the connectors; and attaching the single piece of gear to the belt or strap by performing steps (B) through (F) with respect to each of the plurality of connectors. In various example embodiments the method may further comprise the steps of: detaching the single piece of gear from the belt or strap by performing steps (G) through (K) with respect to each of the plurality of connectors. The belt or strap may be inverted so that its upper surface is vertically lower than its lower surface.

Also provided in various example embodiments is a method of repeatedly attaching and detaching gear securely to a base comprising regularly spaced-apart rows of straps that are attached to the base at periodic intervals along the straps (such as a MOLLE/PALS attaching system), without the use of tools, the method comprising the steps of (A) providing a reusable connector, the connector comprising: a slide member comprising an elongated first body extending longitudinally from a first end to a second end and having a width between a left side and a right side and having a thickness between a front side and a back side, with a protrusion extending from the second end of the front side, the protrusion defining a first support surface adapted to securely engage a first edge of a belt or strap, the slide member having first teeth extending outward from the front side; an engagement member comprising a second body comprising a second support surface adapted to engage a second edge of the belt or strap, the engagement member further comprising one or more second teeth adapted to engage the first teeth, the engagement member slidably attached with the slide member and positioned so that the first and second teeth are engaged and so that the second support surface faces the first support surface; a fastener adapted to fasten gear to the connector; the first and second teeth configured to allow the engagement member to be translated toward the protrusion without the use of tools but not translated away from the protrusion when the first and second teeth are engaged; the first end of the slide member adapted to be elastically deflected away from the engagement member sufficiently to disengage the first and second teeth, without the use of tools; and the engagement member adapted to be translated away from the protrusion without the use of tools when the first end of the slide member is elastically deflected away from the engagement member sufficiently to disengage the first and second teeth; (B) providing a base comprising regularly spaced-apart rows of straps that are attached to the base at periodic intervals along the straps, each strap having a width between an upper surface and a lower surface; (C) inserting the second end of the slide under a first one of the straps; (D) positioning the first strap so that its lower surface is adjacent the second support surface of the engagement member; (E) positioning the first strap adjacent the front surface of the slide the slide member; and (F) translating the slide member relative to the engagement member so that the first support surface of the slide member moves toward the engagement member until the first support surface contacts and securely engages the upper surface of the first strap, while simultaneously guiding the first end of the slide member under a second one of the straps as the slide member translates longitudinally past the engagement member; (G) all of the foregoing steps being accomplished without the use of tools.

In various example embodiments the above method may further comprise the steps of: (H) pushing on the first end of the slide and elastically bending the slide laterally away from the engagement member sufficiently to disengage the first and second teeth; (I) translating the slide member relative to the engagement member so that the first support surface of the slide member moves away from the engagement member until the first support surface disengages the upper surface of the first strap, while simultaneously guiding the first end of the slide member out from under the second one of the straps as the slide member translates longitudinally past the engagement member; (J) moving the first strap away from the front surface of the slide the slide member; and (K) removing the second end of the slide out from under the first one of the straps; (L) all of the foregoing steps being accomplished without the use of tools. In various example embodiments the above method may further comprise the steps of providing a plurality of the connectors; using the fasteners adapted to fasten gear to the connectors, attaching the plurality of connectors to a single piece of gear at intervals dimensionally corresponding to the periodic intervals at which the spaced-apart rows of straps are attached to the base; and attaching the single piece of gear to the first and second straps by performing steps (B) through (G) with respect to each of the plurality of connectors. In various example embodiments the above method may further comprise the steps of detaching the single piece of gear from the first and second straps by performing steps (H) through (L) with respect to each of the plurality of connectors. The straps may be inverted so that their upper surfaces are vertically lower than their lower surfaces.

The foregoing summary is not limiting and does not define the invention, which is set forth in the allowed claims.

BRIEF DESCRIPTION OF THE DRAWINGS

The accompanying figures illustrate certain non-limiting aspects of example embodiments of the invention.

FIG. 3A is a side elevation view of the example connector of FIG. 1A, shown attached to example gear and shown with a user closing or tightening the connector.

FIG. 3B is a side elevation view of the example connector of FIG. 1A, shown attached to example gear and shown with a user opening or loosening the connector.

FIG. 4A1 is a perspective view of the example connector of FIG. 1A, shown in use in the "low" position with a portion of a belt clamped into the connector.

FIG. 4A2 is a back elevation view of two of the example connectors of FIG. 4A1, shown in use connected to a pistol holster in the "low" position with a portion of the belt clamped into the connectors.

FIG. 4B1 is a perspective view of the example connector of FIG. 1A, shown in use in the "high" position with a portion of a belt clamped into the connector.

FIG. 4B2 is a back elevation view of two of the example connectors of FIG. 4B1, shown in use connected to a pistol holster in the "high" position with a portion of the belt clamped into the connectors.

DETAILED DESCRIPTION OF EXAMPLE EMBODIMENTS

Reference is made herein to some specific examples of the present invention, including any best modes contemplated by the inventor for carrying out the invention. Examples of these specific embodiments are discussed above in the Summary and illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the claims.

Figure 1A:
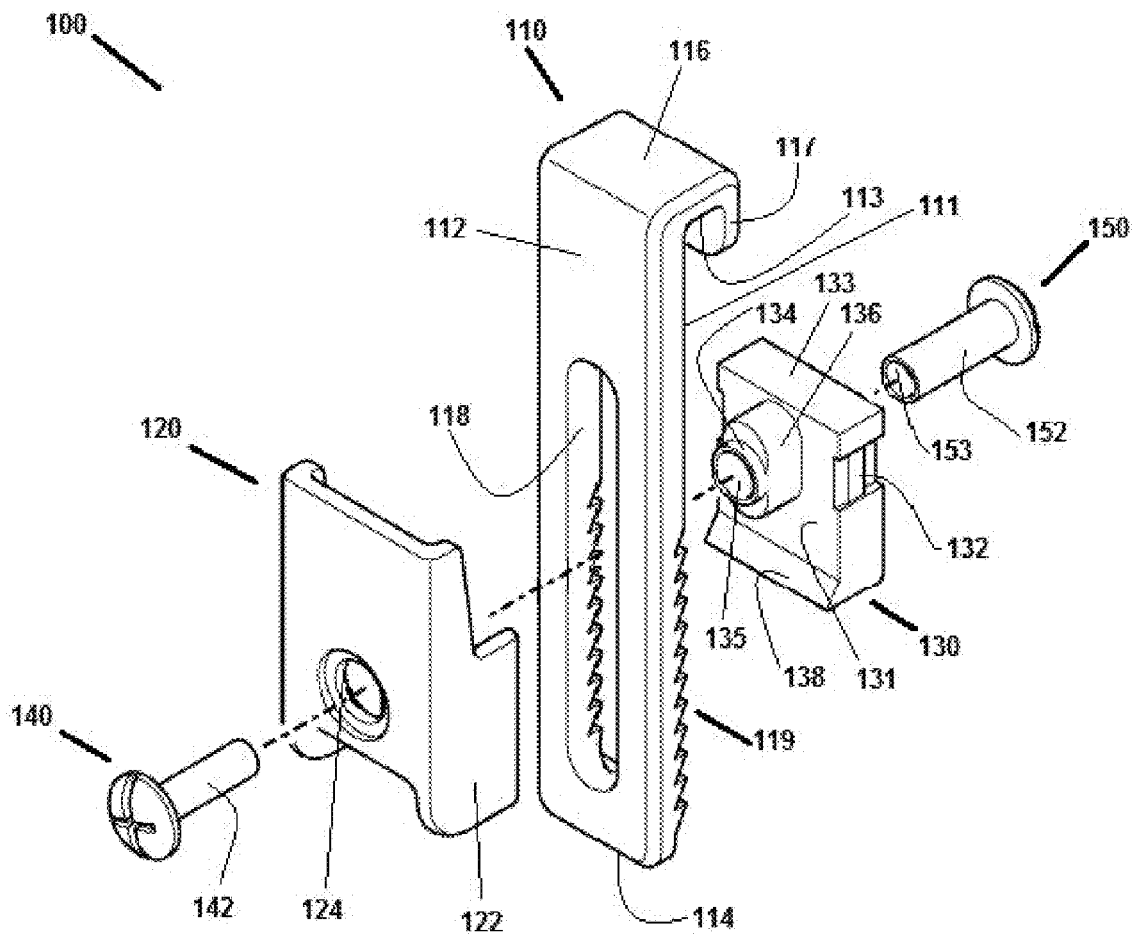
FIG. 1A is a perspective exploded view of an example connector according to various example embodiments of the invention.
Figure 1B:
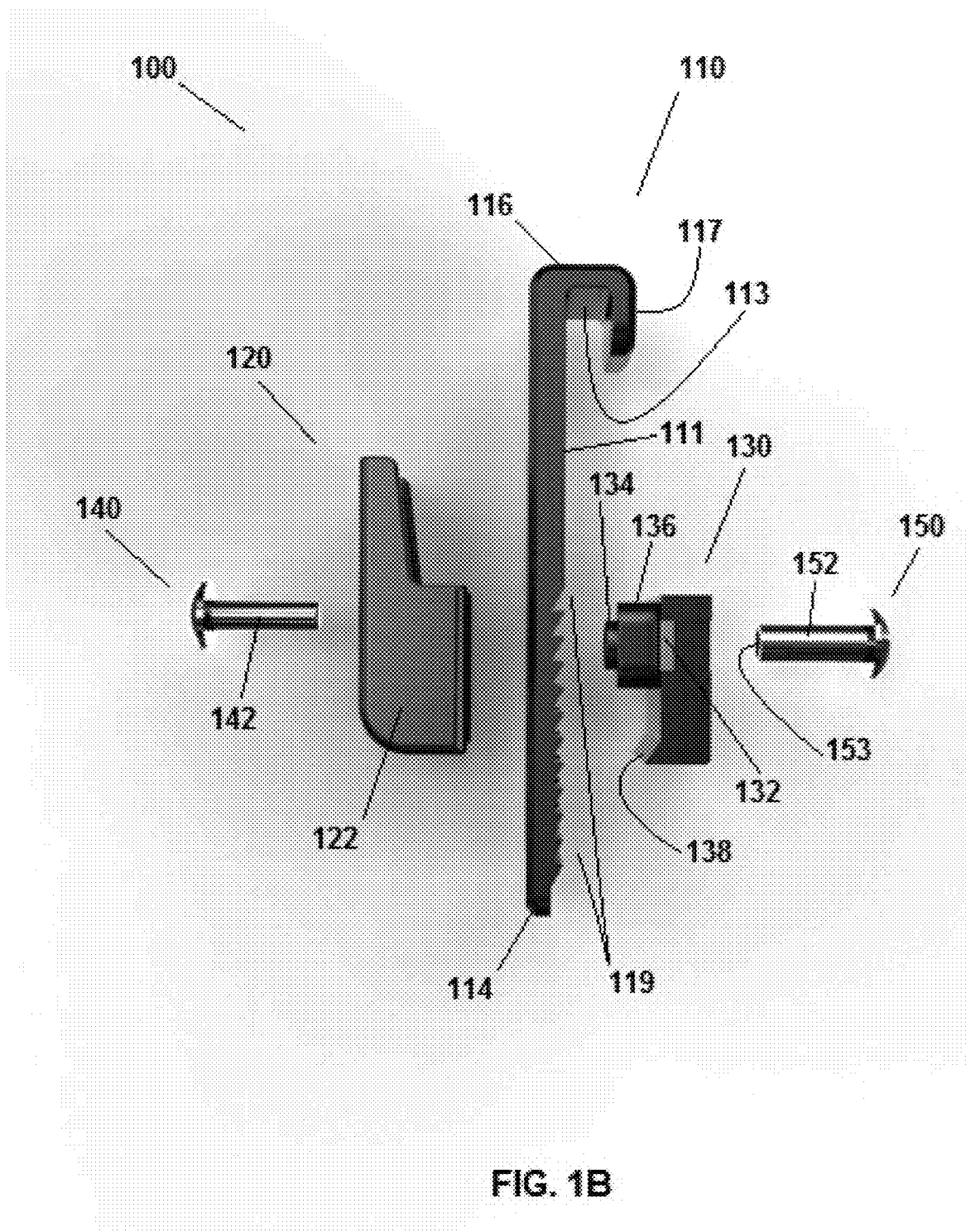
FIG. 1B is a side elevation exploded view of the example connector of FIG. 1A.

FIGS. 1A and 1B depict example features of an example connector apparatus 100, which may include a slide 110 that may be movably positioned between a clamp 120 and an engagement member 130 having at least one tooth 138 adapted and positioned to mate with corresponding teeth 119 attached with the slide 110. In various example embodiments the slide 110 may be positioned between the clamp 120 and the engagement member 130 by one or more fasteners 140, 150 that connect and urge together the clamp 120 and engagement member 130.

Figure 2C:
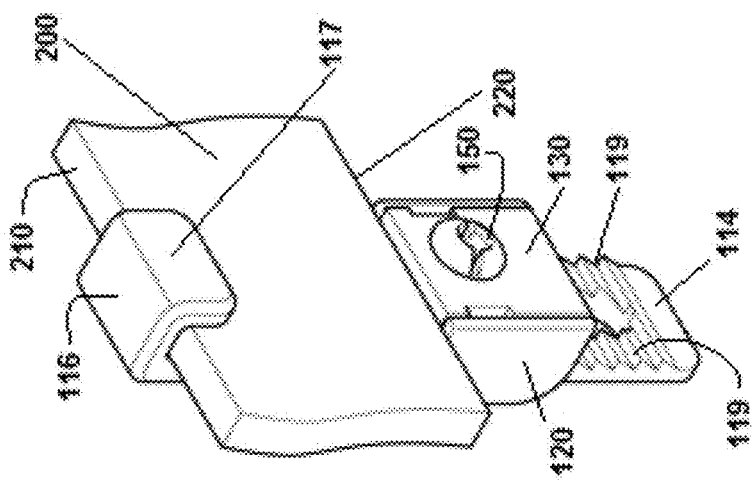
FIG. 2C is a perspective view of the example connector of FIG. 1A, shown in use with a portion of a belt clamped into the connector.
Figure 2B:
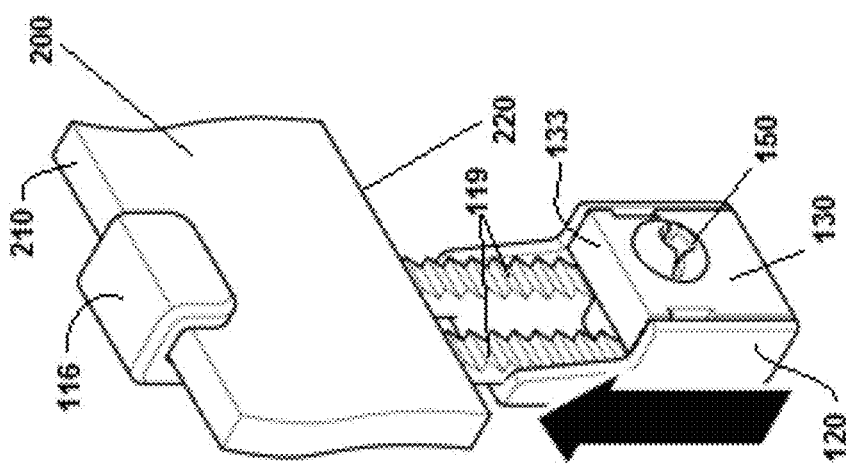
FIG. 2B is a perspective view of the example connector of FIG. 1A, shown in use when clamping a portion of a belt into the connector.
Figure 2A:
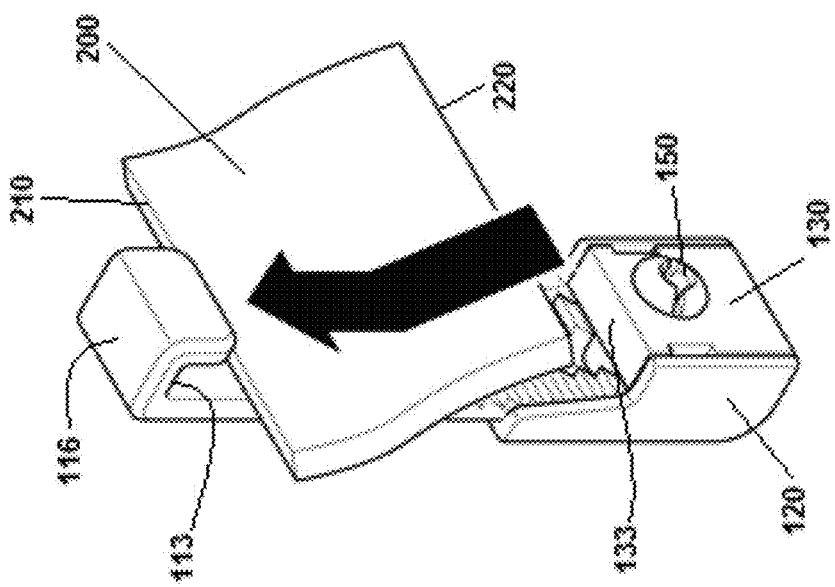
FIG. 2A is a perspective view of the example connector of FIG. 1A, shown in use when inserting a portion of a belt into the connector.
Figure 5:
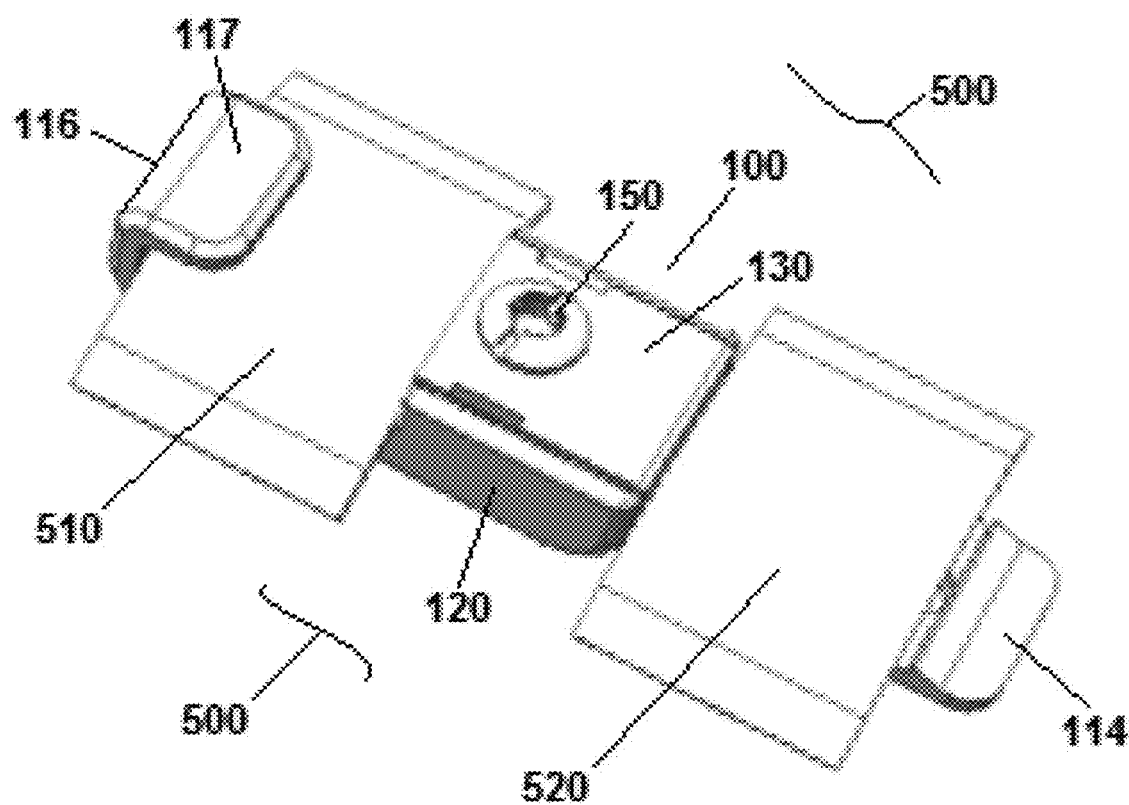
FIG. 5 is a front perspective view of the example connector of FIG. 1A, shown in use in a portion of an example MOLLE/PALS system.

In various example embodiments the slide 110 may comprise an elongated body extending longitudinally from a first end 114 to a second end 116 and having a thickness between a front side 111 and a back side 112, with a protrusion such as a hook 117 attached to or extending from the second end 116 of the front side 111, where the protrusion or hook 117 may define a cavity or first support surface 113 adapted to securely engage a first edge 210 of a belt, strap, or other attachment means 200, 510 of a base unit (e.g., 500), as further depicted in FIG. 2A and FIG. 5, for example. Teeth or other positional engagement means 119 may be formed into or connected with the front side 111, and in various example embodiments a longitudinally-extending through-slot 118 may pass from the front side 111 through to the back side 112. Any other suitable geometries for a slide 110 may be used as would be apparent to persons of skill in the art.

With continuing reference to FIGS. 1A and 1B, clamp 120 may in various example embodiments comprise a body that is adapted to at least partially envelope the slide 110 with first and second sides 122, while allowing the slide 110 to translate longitudinally with respect to the clamp 120. First and second sides 122 may be adapted to extend around the sides of slide 110 and engage with the engagement member 130, for instance with protrusions (not shown) extending inward from the sides 122 that removably engage with mating detents 132 on opposite sides of the engagement member 130. Clamp 120 may further comprise a through hole 124 adapted to receive a fastener 140 there through. Fastener 140 may engage with other means to clamp the slide 110 between the clamp 120 and the engagement member 130, for instance by passing through the hole 124 in the clamp 120 and passing through the slot 118 in the slide 110 and having a first engagement portion 142, such as external screw threads, engage with a second engagement portion 153, such as internal screw threads, of a mating fastener 150 that is attached with engagement member 130, for instance by passing through a hole 135 in engagement member 130.

Engagement member 130 may be adapted to engage with clamp 120 as described with respect to one example embodiment above, and may be further adapted to thereby allow the slide 110 to translate longitudinally with respect to the engagement member 130, except for the translation limiting features provided by one or more teeth 138 and an oblong boss 136, both extending outward from a face 131 adapted to interface with the front side 111 of the slide 110. The boss 136 may in various example embodiments be adapted to extend at least partially through and slide against the sides of the slot 118 in the slide 110, and thereby limit the longitudinal translation of the engagement member 130 with respect to the slide 110 to correspond with the longitudinal length of the slot 118. Boss 136 may in various example embodiments further comprise a pilot boss 134 extending outward from the boss 136, where the outer profile of the pilot boss 134 is adapted to closely engage the inner profile of the hole 124 in the clamp 120, and thereby accurately locate the clamp 120 with respect to the engagement member 130. Engagement member 130 may be provided with a second support surface 133 adapted to longitudinally engage a second edge 220 of a belt, strap, or other attachment means 200, 510 of a base unit (e.g., 500), as further depicted in FIGS. 2A-2C and FIG. 5, for example.

In the example embodiment shown in FIG. 1A, a through hole 135 is provided through the engagement member 130, passing through the boss 136 and through pilot boss 134, so that the fasteners 140, 150 may pass there through and thereby join together the connector assembly 100. Fasteners 140, 150 may be adapted to be compression limiting on the connector assembly 100, for instance by providing a male fastener 140 that is dimensionally limited in how far it can engage a female faster 150, where the female fastener 150 has an outer profile 152 that may be adapted to both slide through and closely locate against the inner profile of hole 135 and bottom-out against the underside of the head of fastener 140 when fully fastened.

In addition to the boss 136, one or more teeth 138 may extend outward from the face 131 of engagement member 130 to limit the longitudinal translation of the slide 110 with respect to the engagement member 130. As more specifically illustrated in FIG. 1C, engagement member 130 may be provided with one or more teeth comprising an angled surface 138 (i.e., at an obtuse or acute angle to the longitudinal direction of translation of the slide 110) and a lower surface 139 that in various example embodiments may be substantially horizontal (i.e., substantially perpendicular to the longitudinal direction of translation of the slide 110). Slide 110 may be provided with a series of complementary teeth 119 comprising an angled surface 119a (i.e., at an obtuse or acute angle to the longitudinal direction of translation of the slide 110 and corresponding to the angle of surface 138) and a lower surface 119s that in various example embodiments may be substantially horizontal (i.e., substantially perpendicular to the longitudinal direction of translation of the slide 110 and corresponding to the angle of lower surface 139).

The above tooth geometry is merely an example, and the invention is not limited to any particular tooth profile. The geometry of lower surface 139 and abutment surface 119s can be any suitable geometry that results in the slide 110 not being able to move in the "loosen" direction shown in FIG. 1C with respect to the engagement member 130, under normal use conditions of the assembled connector 100, unless the slide 110 is manually deflected away from the engagement member 130 as shown in FIG. 3B. Additionally, the geometry of angled surface 138 and corresponding angled surface 119a can be any suitable geometry that results in the slide 110 being able to move in the "tighten" direction shown in FIG. 1C with respect to the engagement member 130, under normal use conditions of the assembled connector 100, when a user simply pushes on slide 110 in the longitudinal direction. In other words, any "tooth" geometries can be used that result in the slide 110 moving with respect to the engagement member like a zip tie, i.e., easy to tighten yet not able to be loosened during normal use without manually moving the teeth away from each other. But unlike a zip tie, which typically requires a tool to release and then is usually damaged, the present invention provides a truly reusable structure that a user can easily release by simply elastically deflecting the first end 114 of the slide 110 laterally away from the engagement member, as shown in FIG. 3B. In order to be sufficiently rigid and strong yet readily deflectable, any suitable materials may be used for any or all of the pieces of connector 100, such as a polymer, for instance Nylon 6/6, reinforced polymers, or any other suitably rigid, strong, yet readily deflectable material.

Figure 1C:
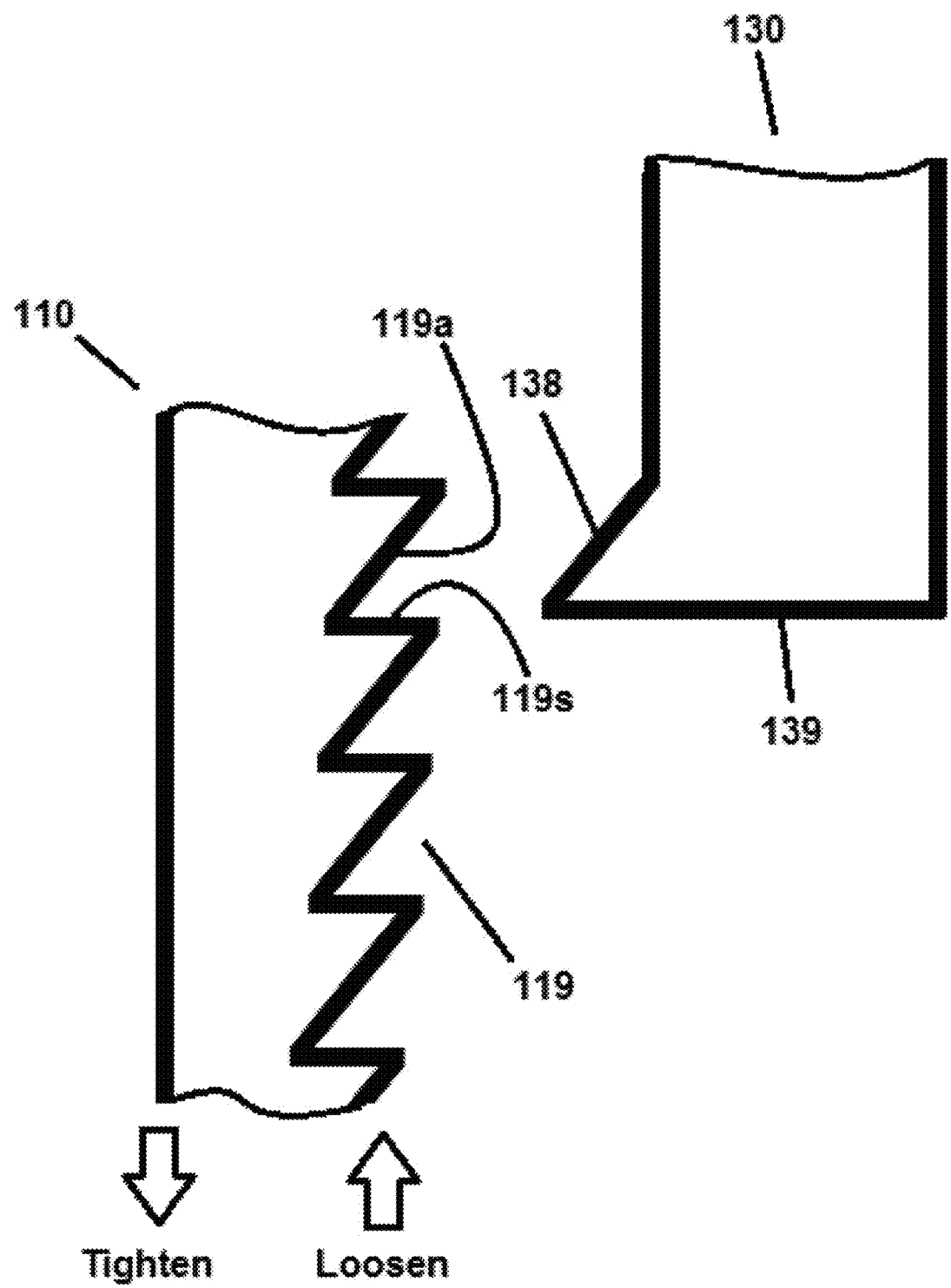
FIG. 1C is a cutaway side elevation view of example engagement means of the example connector of FIG. 1A.

Turning to FIGS. 2A, 2B, 2C, the example connector 100 of FIG. 1 will now be discussed in use in connecting the connector 100 to a base such as a belt or strap or other similar member 200. A belt or strap or other similar member 200 can be positioned so that its upper surface 210 is adjacent the first support surface 113 and is securely engaged by the hook 117. The belt or strap 200 or other similar member may then also be placed adjacent the front surface 111 of the slide 110, as shown in FIG. 2B. Then the engagement member 130, positioned adjacent the teeth 119 of the slide 110 by the clamp 120 and fasteners 140, 150, can be translated relative to the slide 110 toward the second end 116 of the slide 110, until the second support surface 133 of the engagement member 130 contacts the lower surface 220 of the belt or strap or other similar member 200, as shown in FIG. 2C. When the engagement member 130 is translated relative to the slide 110 toward the second end 116 of the slide 110, the corresponding angled "teeth" 138, 119*a* slide over the top of one another like a zip tie, i.e., easy to tighten yet not able to be loosened during normal use without manually separating the teeth by moving them away from each other. In this fashion the belt or strap or other similar member 200 can be pinched or otherwise physically secured to the connector 100, so that the connector 100, and any gear 900 attached to the connector 100 (as shown in FIGS. 3A and 3B) will be securely fastened to the base having the belt or strap or other similar member 200, such that the gear 900 will not readily slide around on the belt or strap or other similar member 200.

FIGS. 3A and 3B further depict the connector 100 in use and connected to gear 900, but the belt or strap or other similar member 200 is omitted from these figures for clarity. The gear 900 is shown only in relevant part in FIGS. 3A and 3B, and may in practice comprise any type of gear as explained in the Background, such as a holster. Any suitable gear 900 may be attached to the connector 100 by the shaft 152 of the fastener 150 passing through a hole or slot (not explicitly shown) in the gear, and connecting with the connector 100 in any suitable way, for instance as described with reference to FIG. 1A. In various example embodiments, an elastomeric member 800 may be positioned between the engagement member 130 and the gear 900, for instance a conventional rubber O-ring or grommet positioned with the shaft 152 of the fastener 150 passing through an opening there through. The elastomeric member 800 may facilitate improved function of the system comprising the connector 100 by acting as a spacer and a deflectable spring, allowing easier manipulation and rotation of the connector 100 when attached to gear 900.

As depicted in FIG. 3A with reference to FIGS. 2A-2C, the connector 100 can be tightened or "locked" onto a belt or strap or other similar member 200 by a user's finger(s) 300A or other object pushing on the second end 116 of the slide 110, and translating the slide 110 so that the second end 116 moves closer to the engagement member 130. The connector 100 will then remain locked onto the belt or strap or other similar member 200 like a zip tie as previously explained. Also, as depicted in FIGS. 3A and 3B with reference to FIGS. 1A and 2C, the gear 900 is typically positioned directly across from the front side 111 of the slide 110, such that the gear 900 typically tends to act as physical barrier preventing the belt or strap or other similar member 200 from sliding off the second support surface 133 of the support member 130.

As depicted in FIG. 3B with reference to FIG. 1C, the connector 100 can be loosened or "unlocked" from a belt or strap or other similar member 200 by a user's finger(s) 300B or other object pushing on the first end 114 of the slide 110 so as to elastically bend the slide 110 laterally away from the engagement member 130 so that the lower surface 119*s* of the teeth 119 on the slide 110 disengage from the lower surface(s) 139 of the one or more teeth 138 of the engagement member 130, and then translating the slide 110 so that the second end 116 moves farther away from the engagement member 130. Such elastic bending may be facilitated by sizing the slide 110 so that when the connector 100 is engaged on a belt or strap or other similar member 200 as shown for example in FIG. 2C, the first end 114 of the slide 110 extends longitudinally sufficiently past the engagement member 130 and the clamp 120 to allow sufficient cantilever bending of the slide 110 when pushed on, for example as depicted in FIG. 3B. Once the connector 100 is loosened or "unlocked" from a belt or strap or other similar member 200 as depicted in FIG. 3B, the connector 100 and any attached gear 900 may be removed from the belt or strap or other similar member 200 attached with a base by quickly and easily performing the steps described with reference to FIGS. 2A-2C in reverse.

Another advantage of various example embodiment of the present connector apparatus, system, and method of use is the ability to mount gear 900 alternatively either high or low on the base by simply vertically inverting the connector 100 by rotating the connector 100 about its pivot point, namely the rotational axis created by fasteners 140, 150. An example of this is illustrated in FIGS. 4A1 and 4B 1. To further illustrate the invertability of the connectors 100, a holster 440 is shown mounted to a plurality of connectors 100 in both a low position (FIG. 4A2), and a high position (FIG. 4B2).

It has been discovered that various example embodiments of the present connector apparatus, system, and method can perform especially well when a plurality of connectors 100 are connected with a single piece of gear 900, such as the pair of connectors 100 used on the holster 440 in the example illustrated in FIGS. 4A2 and 4B2. In particular, it has been discovered that when the gear 440 attempts to slide or otherwise move laterally on the belt 200, the plurality of connectors 100 tend to rotate about their respective pivot points, namely fasteners 140, 150, causing the first support surfaces 113 of each of the slides 110 to tend to bite into and more securely engage the first edge 210 of the belt, strap, or other attachment means 200 of a base unit (reference FIG. 2A).

Turning to FIG. 5, various example embodiments of the present connector apparatus, system, and method have been found to work especially well with the MOLLE/PALS attachment or connecting system described herein. FIG. 5 depicts the example connector 100 of FIG. 1A simultaneously engaged with two different straps 510, 520 attached to a base 500 as would be typical of a MOLLE/PALS attachment or connecting system. As described in the Background, including the information incorporated herein, the MOLLE/PALS attachment or connecting system typically comprises a base 500 having a plurality of rows of straps sewn or attached to the base 500 at periodic intervals (one interval of two rows of straps is shown as 510, 520). A wide variety of gear may then be attached to those straps. The problem has been finding a quick and effective means to securely attach gear to those straps, as most other solutions involve time-consuming and cumbersome weaving of items through the straps or using connectors that are less than secure. These problems may be overcome in an elegant fashion using various example embodiments of the present connector apparatus, system, and method, for instance as shown in FIG. 5. Specifically, because various example embodiments of connector 100 may include a first end 114 of the slide 110 extending longitudinally sufficiently past the engagement member 130 and the clamp 120 to allow sufficient cantilever bending of the slide 110 when pushed on (for example as depicted in FIG. 3B), that cantilevered first end 114 of the slide 110 may also be readily sized and shaped to extend under a second strap row interval 520 when a first strap row interval 510 is tightened or "locked" between the second end 116 and hook 117 of the slide 110 and the second support surface 133 of the engagement member 130, for example as shown in FIG. 5.

Thus, various example embodiments of the present connector apparatus, system, and method may be used with a MOLLE/PALS attachment or connecting system by taking the following steps. Installation of gear 900 to base 500 using a connector 100 may be accomplished with the following steps, for example: (1) opening the connector 100 by a user's finger(s) 300B or other object pushing on the first end 114 of the slide 110 so as to elastically bend the slide 110 laterally away from the engagement member 130 so that the lower surface 119s of the teeth 119 on the slide 110 disengage from the lower surface(s) 139 of the one or more teeth 138 of the engagement member 130, and then translating the slide 110 so that the second end 116 moves farther away from the engagement member 130; (2) inserting the second end 116 and hook 117 of the slide 110 under a first strap row interval 510; and (3) tightening or "locking" the first strap row interval 510 between the second end 116 and hook 117 of the slide 110 and the second support surface 133 of the engagement member 130 as described herein with respect to FIGS. 2A, 2B, 2C, and 3A; while (4) guiding the first end 114 of the slide 110 under a second strap row interval 520 as the slide 110 translates longitudinally past the clamp 120 and engagement member 130. While omitted from FIG. 5 for clarity, it is understood that any of a wide variety of gear 900 would typically be attached to the connector 100 via fastener 150, for instance as shown in FIGS. 3A and 3B. Also, a plurality of connectors 100 could be affixed to the gear 900 and used in this manner when spaced-apart consistent with the periodic spacing of the straps sewn or attached to the base 500 at the same periodic intervals (where one interval of two rows of straps is shown as 510, 520).

Removal of gear 900 from the base 500 using the connector 100 may then be accomplished with the following steps, for example: (1) opening the connector 100 by a user's finger(s) 300B or other object pushing on the first end 114 of the slide 110 so as to elastically bend the slide 110 laterally away from the engagement member 130 so that the lower surface 119s of the teeth 119 on the slide 110 disengage from the lower surface(s) 139 of the one or more teeth 138 of the engagement member 130, and then translating the slide 110 so that the second end 116 moves farther away from the engagement member 130; (2) guiding the first end 114 of the slide 110 out from under the second strap row interval 520 as the slide 110 translates longitudinally past the clamp 120 and engagement member 130; and (3) removing the second end 116 and hook 117 of the slide 110 out from under the first strap row interval 510.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A reusable connector capable of repeatedly attaching and detaching gear tightly to belts or straps of different widths, without the use of tools, the connector comprising:
 a slide member comprising an elongated first body extending longitudinally from a first end to a second end and having a width between a left side and a right side and having a thickness between a front side and a back side, with a protrusion extending from the second end of the front side, the protrusion defining a first support surface adapted to securely engage a first edge of a belt or strap, the slide member having first teeth extending outward from the front side;
 an engagement member comprising a second body comprising a second support surface adapted to engage a second edge of the belt or strap, the engagement member further comprising one or more second teeth adapted to engage the first teeth, the engagement member slidably attached with the slide member and positioned so that the first and second teeth are engaged and so that the second support surface faces the first support surface;
 a fastener adapted to fasten the gear to the connector;
 the first and second teeth configured to allow the engagement member to be translated toward the protrusion without the use of tools but not translated away from the protrusion when the first and second teeth are engaged;
 the first end of the slide member adapted to be elastically deflected away from the engagement member sufficiently to disengage the first and second teeth, without the use of tools;
 the engagement member adapted to be translated away from the protrusion without the use of tools when the first end of the slide member is elastically deflected away from the engagement member sufficiently to disengage the first and second teeth;
 a clamp comprising a third body adapted to at least partially envelope the slide member, the clamp connected with the engagement member;
 one or more fasteners connecting the clamp and engagement member; and
 a longitudinally-extending through-slot passing from the front side through to the back side of the slide member, the one or more fasteners passing through the slot.

2. The connector of claim 1, further comprising:
 a boss connected with the engagement member and extending into the through-slot, the one or more fasteners passing through a hole in the boss.

3. The connector of claim 1, wherein the clamp member further comprises first and second sides adapted to extend around the left and right sides of the slide member and engage with corresponding first and second sides of the engagement member.

4. The connector of claim 1, wherein the protrusion comprises a hook.

5. The connector of claim 1, wherein the fastener adapted to fasten the gear to the connector extends outward from the engagement member.

6. The connector of claim 1, further comprising:
an elastomeric member positioned adjacent the engagement member and adjacent the fastener adapted to fasten the gear to the connector, the elastomeric member adapted to function as a spacer and as a deflectable spring between the gear and the engagement member when the gear is attached to the fastener adapted to fasten the gear to the connector.

7. The connector of claim 1, further comprising:
the gear attached to the connector by the fastener is adapted to be fastened to the connector.

8. A method of repeatedly attaching and detaching gear tightly to belts or straps of different widths, without the use of tools, the method comprising the steps of:
(A) providing a reusable connector, the connector comprising:
a slide member comprising an elongated first body extending longitudinally from a first end to a second end and having a width between a left side and a right side and having a thickness between a front side and a back side, with a protrusion extending from the second end of the front side, the protrusion defining a first support surface adapted to securely engage a first edge of a belt or strap, the slide member having first teeth extending outward from the front side;
an engagement member comprising a second body comprising a second support surface adapted to engage a second edge of the belt or strap, the engagement member further comprising one or more second teeth adapted to engage the first teeth, the engagement member slidably attached with the slide member and positioned so that the first and second teeth are engaged and so that the second support surface faces the first support surface;
a fastener adapted to fasten the gear to the connector;
the first and second teeth configured to allow the engagement member to be translated toward the protrusion without the use of tools but not translated away from the protrusion when the first and second teeth are engaged;
the first end of the slide member adapted to be elastically deflected away from the engagement member sufficiently to disengage the first and second teeth, without the use of tools; and
the engagement member adapted to be translated away from the protrusion without the use of tools when the first end of the slide member is elastically deflected away from the engagement member sufficiently to disengage the first and second teeth;
(B) providing a belt or strap having a width between an upper surface and a lower surface;
(C) positioning the belt or strap so that its upper surface is adjacent and securely engaged by the first support surface of the slide member;
(D) positioning the belt or strap adjacent the front surface of the slide member; and
(E) translating the engagement member relative to the slide member toward the second end of the slide member until the second support surface of the engagement member contacts the lower surface of the belt or strap;
(F) all of the foregoing steps being accomplished without the use of tools.

9. The method of claim 8, further comprising the steps of:
(G) pushing on the first end of the slide and elastically bending the slide laterally away from the engagement member sufficiently to disengage the first and second teeth;
(H) translating the engagement member relative to the slide member away from the second end of the slide member until the second support surface of the engagement member no longer contacts the lower surface of the belt or strap;
(I) moving the belt or strap away from the front surface of the slide member; and
(J) disengaging the upper surface of the belt or strap from the first support surface of the slide member;
(K) all of the foregoing steps being accomplished without the use of tools.

10. The method of claim 9, further comprising the steps of:
providing a plurality of the connectors;
attaching the plurality of connectors to a single piece of the gear using the fasteners adapted to fasten the gear to the connectors;
attaching the single piece of the gear to the belt or strap by performing steps (B) through (F) with respect to each of the plurality of connectors; and
detaching the single piece of the gear from the belt or strap by performing steps (G) through (K) with respect to each of the plurality of connectors.

11. The method of claim 8, further comprising the steps of:
providing a plurality of the connectors;
attaching the plurality of connectors to a single piece of the gear using the fasteners adapted to fasten the gear to the connectors; and
attaching the single piece of the gear to the belt or strap by performing steps (B) through (F) with respect to each of the plurality of connectors.

12. The method of claim 8, wherein the belt or strap is inverted so that its upper surface is vertically lower than its lower surface.

13. A method of repeatedly attaching and detaching gear securely to a base comprising regularly spaced-apart rows of straps that are attached to the base at periodic intervals along the straps, without the use of tools, the method comprising the steps of:
(A)providing a reusable connector, the connector comprising:
a slide member comprising an elongated first body extending longitudinally from a first end to a second end and having a width between a left side and a right side and having a thickness between a front side and a back side, with a protrusion extending from the second end of the front side, the protrusion defining a first support surface adapted to securely engage a first edge of a belt or strap, the slide member having first teeth extending outward from the front side;
an engagement member comprising a second body comprising a second support surface adapted to engage a second edge of the belt or strap, the engagement member further comprising one or more second teeth adapted to engage the first teeth, the engagement member slidably attached with the slide member and positioned so that the first and second teeth are engaged and so that the second support surface faces the first support surface;

a fastener adapted to fasten the gear to the connector;

the first and second teeth configured to allow the engagement member to be translated toward the protrusion without the use of tools but not translated away from the protrusion when the first and second teeth are engaged;

the first end of the slide member adapted to be elastically deflected away from the engagement member sufficiently to disengage the first and second teeth, without the use of tools; and the engagement member adapted to be translated away from the protrusion without the use of tools when the first end of the slide member is elastically deflected away from the engagement member sufficiently to disengage the first and second teeth;

(B) providing a base comprising regularly spaced-apart rows of straps that are attached to the base at periodic intervals along the straps, each strap having a width between an upper surface and a lower surface;

(C) inserting the second end of the slide under a first one of the straps;

(D) positioning the first strap so that its lower surface is adjacent the second support surface of the engagement member;

(E) positioning the first strap adjacent the front surface of the slide the slide member; and (F) translating the slide member relative to the engagement member so that the first support surface of the slide member moves toward the engagement member until the first support surface contacts and securely engages the upper surface of the first strap, while simultaneously guiding the first end of the slide member under a second one of the straps as the slide member translates longitudinally past the engagement member;

(G) all of the foregoing steps being accomplished without the use of tools.

14. The method of claim 13, further comprising the steps of:

(H) pushing on the first end of the slide and elastically bending the slide laterally away from the engagement member sufficiently to disengage the first and second teeth;

(I) translating the slide member relative to the engagement member so that the first support surface of the slide member moves away from the engagement member until the first support surface disengages the upper surface of the first strap, while simultaneously guiding the first end of the slide member out from under the second one of the straps as the slide member translates longitudinally past the engagement member;

(J) moving the first strap away from the front surface of the slide the slide member; and (K) removing the second end of the slide out from under the first one of the straps;

(L) all of the foregoing steps being accomplished without the use of tools.

15. The method of claim 14, further comprising the steps of:

providing a plurality of the connectors;

using the fasteners adapted to fasten the gear to the connectors, attaching the plurality of connectors to a single piece of the gear at intervals dimensionally corresponding to the periodic intervals at which the spaced-apart rows of straps are attached to the base;

attaching the single piece of the gear to the first and second straps by performing steps (B) through (G) with respect to each of the plurality of connectors; and detaching the single piece of the gear from the first and second straps by performing steps (H) through (L) with respect to each of the plurality of connectors.

16. The method of claim 13, further comprising the steps of:

providing a plurality of the connectors;

using the fasteners adapted to fasten the gear to the connectors, attaching the plurality of connectors to a single piece of the gear at intervals dimensionally corresponding to the periodic intervals at which the spaced-apart rows of straps are attached to the base; and attaching the single piece of the gear to the first and second straps by performing steps (B) through (G) with respect to each of the plurality of connectors.

17. The method of claim 13, wherein the straps are inverted so that their upper surfaces are vertically lower than their lower surfaces.

* * * * *